No. 883,245. PATENTED MAR. 31, 1908.
H. E. SIBSON.
MEANS FOR PURIFYING AND REGULATING WATER.
APPLICATION FILED JULY 27, 1907.
2 SHEETS—SHEET 1.
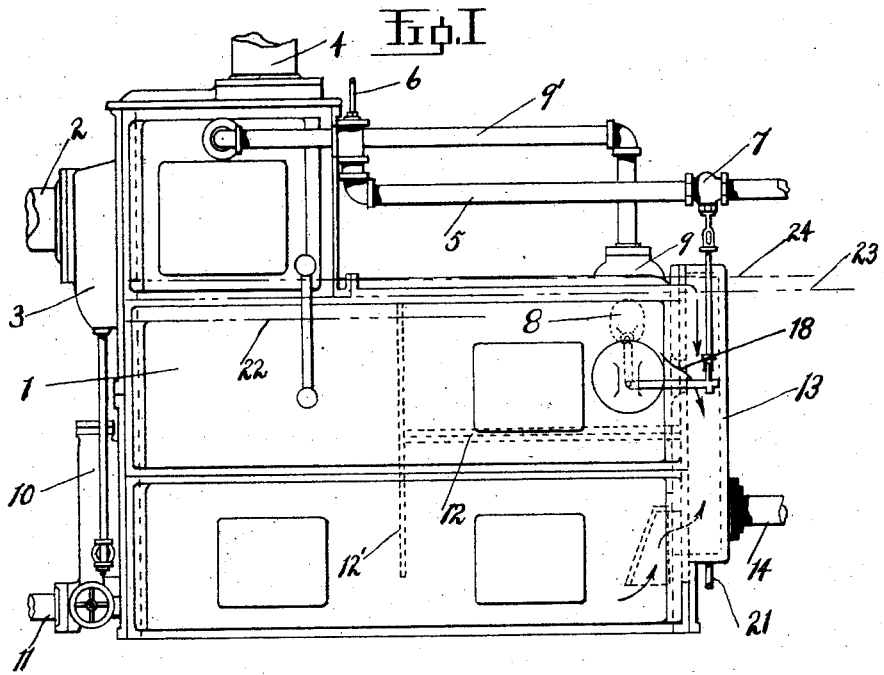
Fig. I
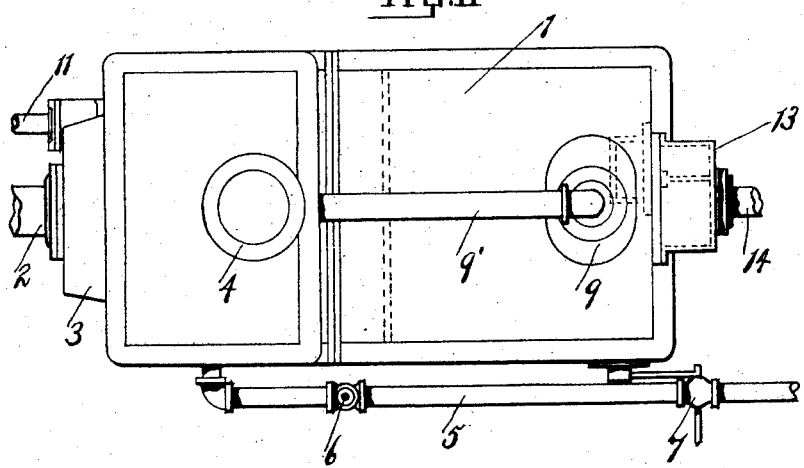
Fig. II
Witnesses:
Wm. P. Hammond
Anna Bennett
Horace E. Sibson Inventor
By his Attorney No. 883,245. PATENTED MAR. 31, 1908.
H. E. SIBSON.
MEANS FOR PURIFYING AND REGULATING WATER.
APPLICATION FILED JULY 27, 1907.
2 SHEETS—SHEET 2.
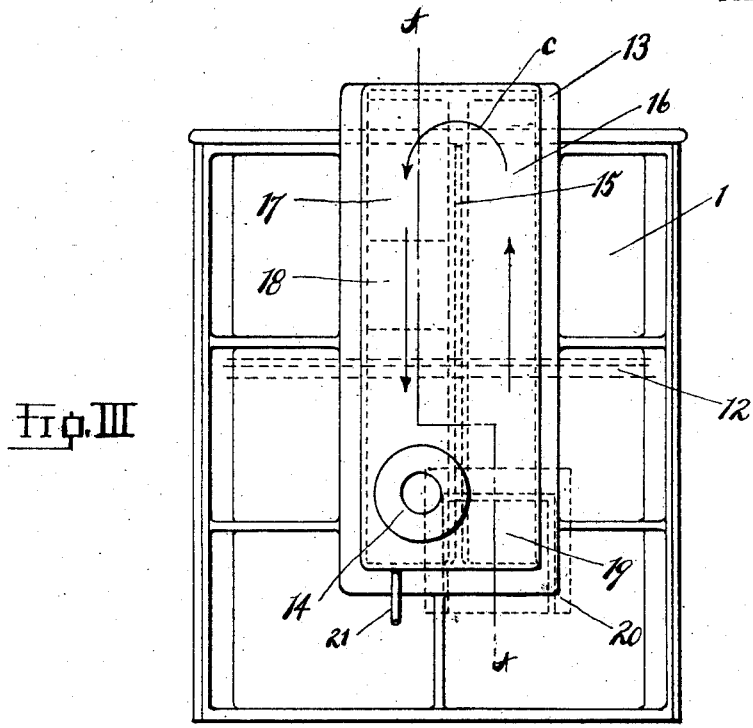
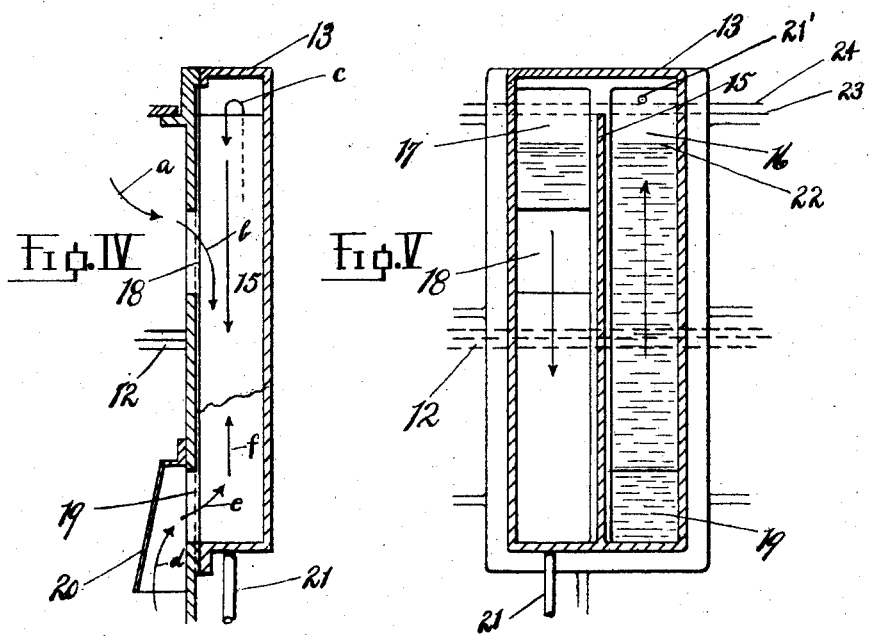

UNITED STATES PATENT OFFICE.

HORACE E. SIBSON, OF PHILADELPHIA, PENNSYLVANIA, ASSIGNOR TO JOSEPH S. LOVERING WHARTON, WILLIAM S. HALLOWELL, AND JOHN C. JONES, DOING BUSINESS UNDER THE FIRM-NAME OF HARRISON SAFETY BOILER WORKS, OF PHILADELPHIA, PENNSYLVANIA.

MEANS FOR PURIFYING AND REGULATING WATER.

No. 883,245.  Specification of Letters Patent.  Patented March 31, 1908.

Application filed July 27, 1907. Serial No. 385,872.

*To all whom it may concern:*

Be it known that I, HORACE E. SIBSON, a citizen of the United States, and resident of and whose post-office address is 6719 Germantown road, Philadelphia, in the county of Philadelphia and State of Pennsylvania, have invented certain new and useful Improvements in Means for Purifying and Regulating Water, of which the following is a specification.

My invention relates to improvements in apparatus for heating, purifying and regulating a supply of liquid, and more particularly to means for insuring an adequate supply of said liquid therefrom.

My improvements are specifically adapted for use in connection with water heaters and purifiers of the type illustrated in the accompanying drawings and described in the following specification. I do not, however, limit myself to this specific use or application of my invention, but, on the contrary, the same is applicable to and adapted for any use where the purification and regulation of liquid is required.

In heaters and purifiers of the particular described type, which are well-known in the art, filters are employed for the purpose of separating impurities from the water passing therethrough, so as to render the same completely purified for use. These filters eventually become choked or clogged with the impurities that have been thus caught or retained by the substance of the filter. This choking or clogging is augmented when a chemical reagent is used to cause a precipitation of the suspended impurities. This clogging of the filtering element results in an inadequate and insufficient supply of water for purposes for which it is required and it, therefore, becomes necessary to supplement the amount of water that passes through the filter with an increment of chemically treated but unfiltered water. By-passes or passageways around the filter have been used for the purpose of furnishing this increment, and it is an improvement in such by-passes or passageways that forms the subject matter of my present invention.

Some of the objects of my improvement, among others, are to provide an exterior circuitous by-pass or passageway, of such construction and location that, when the filtering element becomes partially or wholly inoperative, the increment will be taken from a point most remote from the cold water inlet, thus insuring the by-passing from that strata of water that has had the longest treatment within the heater; to provide an addition to the heater, or, in other words, an auxiliary compartment wherein the unfiltered water by-passed therethrough will be given further time for the precipitation of the contained impurities therefrom; and other objects that will hereafter more fully appear.

In the accompanying drawings I have illustrated an embodiment of my invention, where Figure 1 represents an elevation of a feed water heater and purifier to which my invention has been applied. Fig. 2— a top view thereof. Fig. 3— an end view thereof. Fig. 4— a sectional elevation of my improved by-pass taken on line —A—A— of Fig. 3. Fig. 5— a sectional end elevation thereof.

Throughout the several figures of the drawings like numerals indicate like parts.

Referring to Figs. 1 and 2, —1— indicates a heater; 2— the exhaust inlet from engine or other source of steam supply; 3— a separator; 4— the exhaust pipe from the heater to the atmosphere; 5— a cold water supply pipe; 6— the inlet for the chemical solution or reagent, generally used for the purpose of forming, with the impurities in the water, an insoluble precipitate; 7— a valve in the cold water supply pipe —5— automatically operated through an intermediate mechanism by float —8— located in float chamber —9—, and governed by the water level in the system; 9'— a vent for said float chamber; 10— a water seal; 11— waste pipe; 12— the filter-bed; 12'— a dividing partition; 13— the exterior circuitous by-pass; 14— the outlet to the feed pumps.

Referring now to Figs. 3, 4 and 5, the by-pass —13—, (which may be either formed integral with the heater —1—, or may be separate and attached thereto) is provided with a dividing wall or partition —15— extending from the bottom up to a point adjacent the top, leaving a passageway thereover, and dividing it into two compartments —16— and —17—; the inner wall is provided with two apertures —18— and —19—, aperture —18— being positioned above the filter-bed —12— and opening into compartment or passageway —17—, while aperture —19— is situated below the filter-bed —12— near the bottom of the heater, and is provided with a hood —20—, and opens into compartment or passageway —16—.

21— indicates a drain for compartment —17—, and 21'— a vent for the by-pass —13—.

14— indicates the outlet from the compartment —17— to feed pumps (not shown).

It will be readily understood that the by-pass operates automatically and is governed solely by the condition of the filter —12—. The normal working line is indicated at —22—, —23—, supplementary line at —24—, indicating successive steps in the operation of the heater and the by-pass.

The *modus operandi* is as follows: The cold water enters through pipe —5— in such quantities as governed by float —8— in the float chamber —9—, operating the regulating valve —7—. It will be understood that the float —8— can be adjusted to operate the valve —7— at any predetermined water line. The chemical reagent enters through pipe —6— and mixes with the feed water; the exhaust steam enters through inlet —2— through the separating chamber —3— into the heater, all of which is well-known and consequently needs no further explanation. Upon the mixing of these supplied elements a precipitation immediately begins of the contained impurities. The water normally passes down through the heater around partition —12'—, up through the filter-bed —12—, through aperture —18—, into passage —17— of the exterior by-pass —13—, as indicated by arrows —a—b— (Fig. 4) to the feed pumps. Now, as soon as the filter begins to clog or choke, by reason of the precipitates lodging therein, the water line within the exterior by-pass rises from normal, as indicated at —22—, to line of overflow, as indicated at —23—, thus overflowing partition —15—, as indicated by arrows —c— (Figs. 3 and 4), into compartment or channel —17— of by-pass —13—, where it meets and commingles with the filtered supply coming through aperture —18—. Should the water line within the heater and by-pass become abnormally high as indicated by the supplementary line —24—, the supply through feed inlet —5— will be cut off by the rise of float —8— which operates the valve —7—; but as soon as the water line falls below the top partition —15—, by reason of the same being drawn off by the feed pumps, the valve —7— will open upon the fall of the float —8— in float chamber —9— and permit a further supply of water through feed pipe —5—. Thus it will be seen that a sufficient increment is diverted around the filter to make up the deficiency caused by its choking or clogging, and sufficient and adequate supply furnished to the feed pumps. It is further seen that by the use of a by-pass of my improved construction, the increment is taken from that point in the heater most remote from the feed water inlet, thus insuring the by-passing of the water that has been longest subjected to treatment, and which contains the least amount of impurities, since it has had the longest time for precipitation and agglomeration of the impurities; and, further, the water being thus by-passed up through an exterior circuitous channel or compartment, as indicated by the arrows —d—e—f— (Fig. 4) is afforded further time for precipitation, thus greatly increasing the efficiency of the apparatus in rendering the increment to the filtered supply in as nearly as possible a completely purified condition. The precipitated matter deposited in channel or compartment —17— due to this further treatment is removed through the drain —21—, provided for the purpose. It is also apparent that my improved by-pass being constructed exterior of the heater or tank and separable therefrom, is capable of attachment to existing purifiers, where more efficient purification is wanted.

I do not limit myself to an exterior circuitous by-pass of the particular formation shown, but, on the contrary, the same may be constructed in divers ways and still come within the scope and tenure of my claims.

What I claim and desire to protect by Letters Patent is:

1. In a heater, a filter and an exteriorly arranged vertically reversed by-pass.

2. In a feed water heater, the combination of an interior horizontal filter and an exteriorly arranged vertically reversed by-pass.

3. In a feed water heater, the combination of a feed supply; a filter; a vertically reversed exterior by-pass having its inlet at a point most remote from the feed supply.

4. In a heater, the combination of a feed supply; an exhaust steam supply; a chemical supply; a filter; an exterior vertically reversed by-pass adjacent the filter for automatically supplementing the outflow from the filter by an increment of chemically treated but unfiltered water.

5. The combination of a heater; a filter; a by-pass exterior and about the filter; said by-pass formed of two channels; openings into said by-pass above and below the filter; an outlet and a drain for said by-pass in one of said channels.

6. A filter, an exteriorly arranged vertically reversed by-pass; openings above and below said filter communicating with said by-pass.

7. A filter; a supplementary chamber exterior thereto; a partition within said chamber dividing it into two compartments; an opening connecting the two compartments above said partition; an opening from above the filter into one compartment, and a hooded opening below the filter into the other of said compartments, and a drain from said first-named compartment.

8. A filter; an increment chamber exterior thereto; a dividing partition therein; openings to said increment chamber above and below said filter, and means automatically operating to supplement the outflow through the filter and one of said openings by an increment through the other of said openings.

9. A filter; a double-chambered passageway around the filter; an opening from above the filter into one chamber, and a hooded opening below the filter in the other of said chambers; a drain; and an outlet in said first-mentioned chamber.

10. An attachment for heaters and the like, comprising a tank, a partition within the tank extending to a point below the top and forming a circuitous passageway; an opening in one of said passageways adjacent the top; a vent for said passageway; an opening in the other of said passageways, a drain and an outlet in said last-mentioned passageway.

11. In combination with a heater, a filter and a vertically reversed and exteriorly arranged circuitous by-pass.

Signed at Philadelphia in the county of Philadelphia and State of Pennsylvania this nineteenth day of July 1907.

HORACE E. SIBSON.

Witnesses:
JOSEPH M. HEWLETT,
T. P. SUPLEE.